Figure 1:
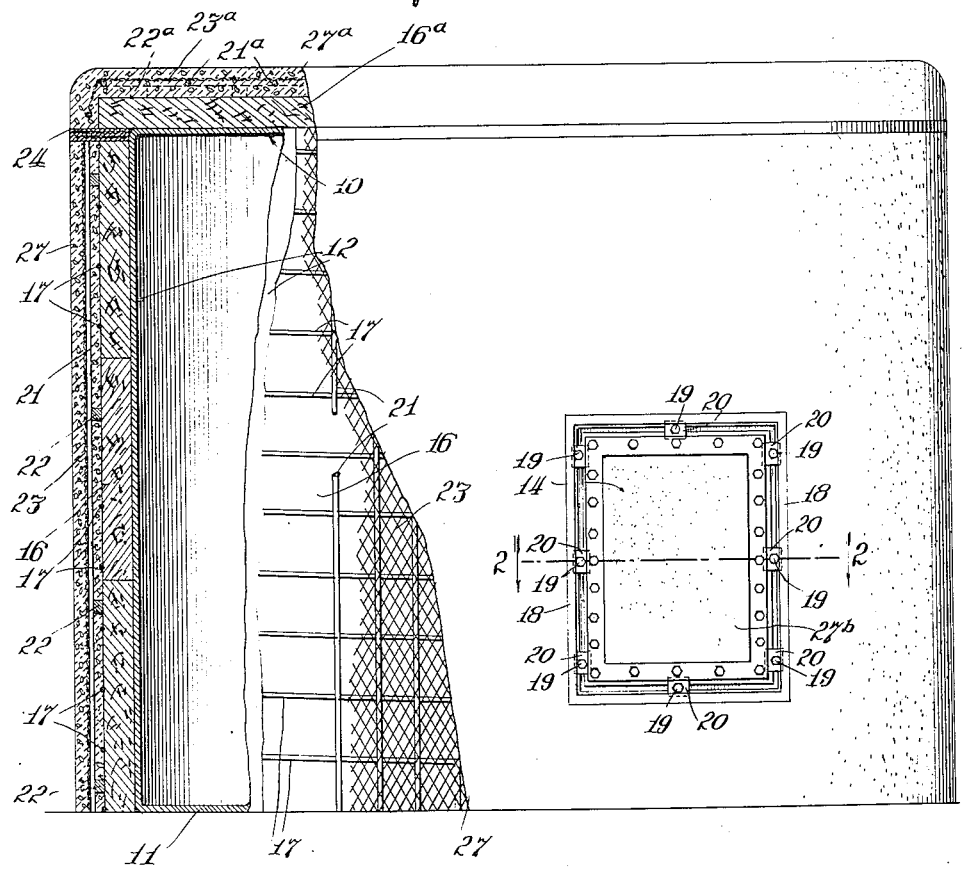

Sept. 4, 1923.

J. C. SMITH ET AL

HEAT INSULATED STRUCTURE

Filed Dec. 5, 1921     2 Sheets-Sheet 1

1,467,121

Inventors
Julian C. Smith
Arnold W. Totman
By Williams Bradbury
McCabe & Pierce
Attorneys Sept. 4, 1923. 1,467,121
J. C. SMITH ET AL
HEAT INSULATED STRUCTURE
Filed Dec. 5, 1921 2 Sheets-Sheet 2
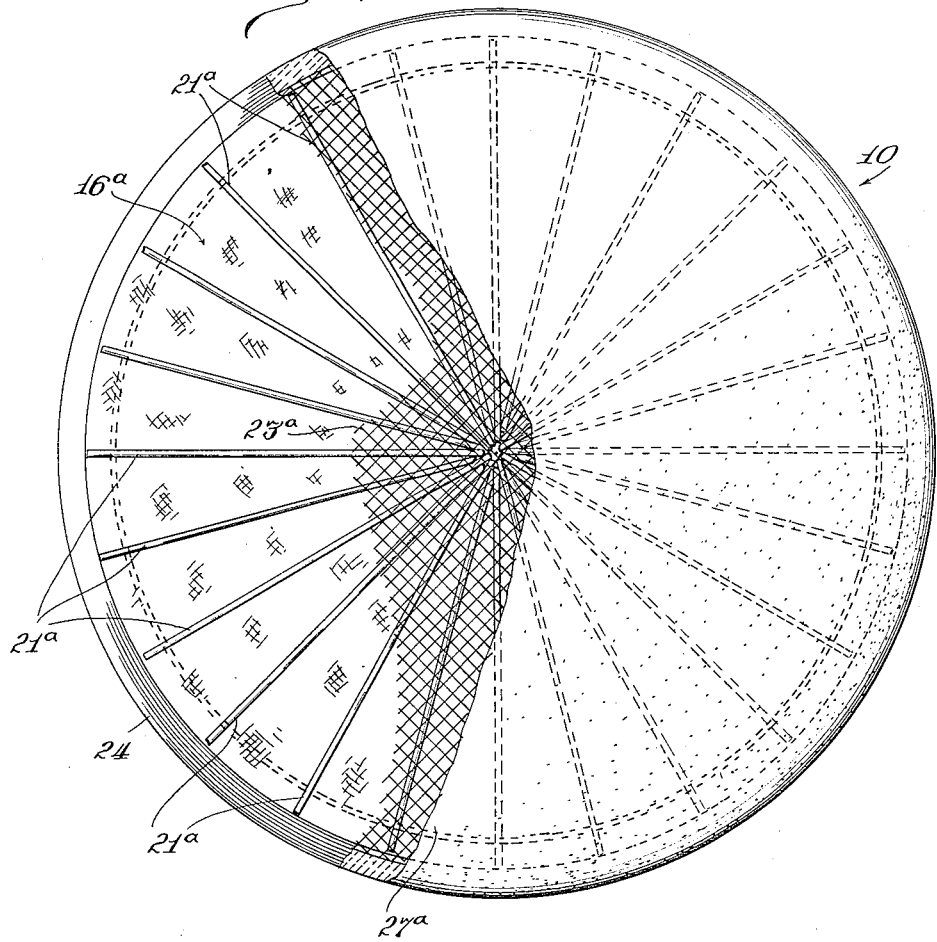
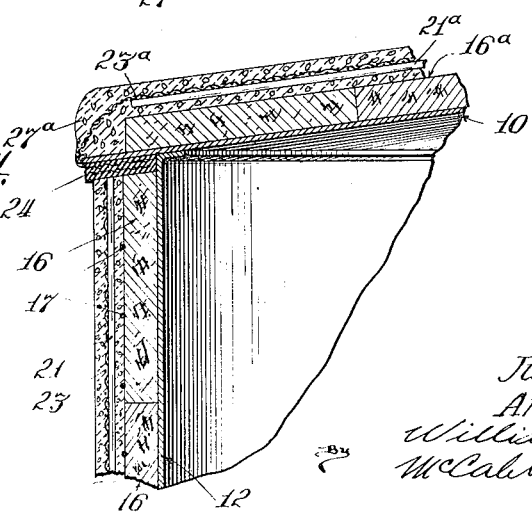

Patented Sept. 4, 1923.

1,467,121

UNITED STATES PATENT OFFICE.

JULIAN C. SMITH AND ARNOLD W. TOTMAN, OF CHICAGO, ILLINOIS.

HEAT-INSULATED STRUCTURE.

Application filed December 5, 1921. Serial No. 520,176.

*To all whom it may concern:*

Be it known that we, JULIAN C. SMITH and ARNOLD W. TOTMAN, citizens of the United States, and residents of Chicago, in the county of Cook and State of Illinois, have invented a certain new and useful Improvement in Heat-Insulated Structures, of which the following is a full, clear, concise, and exact description, reference being had to the accompanying drawings, forming a part of this specification.

Our invention relates to improvements in heat insulated structures. In certain industries use is made of metal tanks within which substantially constant temperatures must, or should be, maintained. Specific examples of the types of tanks to which we refer are the gas purifier tanks and settling tanks employed by petroleum refiners and in other allied industries. Such tanks are large affairs and are almost invariably erected in the open. They are constructed of steel which is a good conductor of heat, and which also expands and contracts to a considerable extent under changes in temperature. For these reasons, great difficulty has heretofore been experienced in maintaining substantially constant temperatures, either high or low, within such tanks.

The maintenance of a substantially constant temperature within a large metal tank is extremely difficult and very expensive when the outer surface of the metal tank is exposed to the widely varying temperatures of the outside air. However, prior to the advent of our invention, it was generally supposed that it was not feasible to provide such a tank with a covering of heat insulating material because of the difficulties encountered in applying such material, and the inability of such material to withstand the ravages of inclement weather. Neither was it supposed that any such heat insulating covering could remain in place upon such a tank, because such tanks always expand and contract to a very large extent and thus would tend to disrupt the heat insulation.

We know of no instance prior to our invention where any settling tank, gas purifier tank or other similar tank had been covered with a material which would practically prevent the conduction of heat to and from the interior of the tank, or which would remain useful for any reasonable length of time when exposed to the natural elements and subjected to the strains imposed thereon due to expansion and contraction of the walls of the tank.

Prior to the advent of our invention, practically all users of tanks of the kinds hereinbefore mentioned had apparently assumed that the conduction of heat through the walls of such tanks from the interiors thereof to the outside air, or vice versa, was unavoidable, or, at any rate, not subject to prevention in any commercially practicable fashion. We know of one or two instances where users of such tanks have resorted to the expedient of locating them within large buildings and then attempting to keep the temperature within said buildings substantially constant. This expedient is a very expensive one and has not given satisfaction.

Our present invention enables us to equip an outside metal tank with an effective covering of heat insulating material that is amply protected from the natural elements, and which will remain in place upon the tank indefinitely despite the fact that the walls of the tank expand and contract under changes in temperature.

In the accompanying drawings wherein we have illustrated our invention

Figure 2:
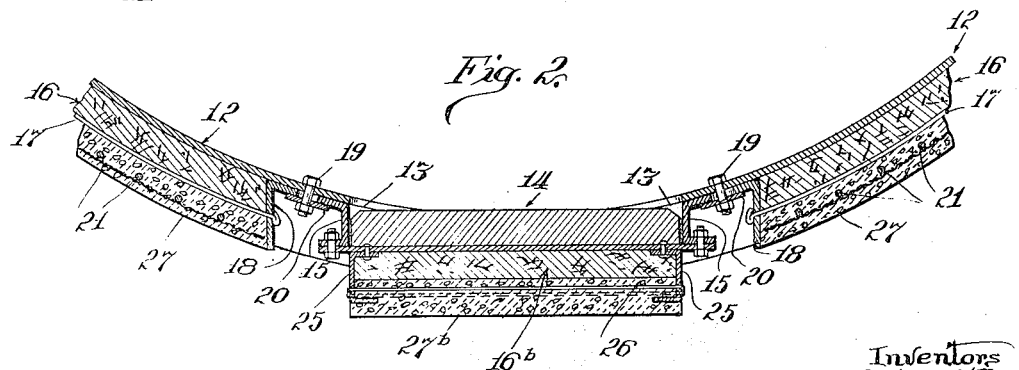

Figure 1 is a view partly in elevation and partly in section of a metal tank which has been provided with the improvements of our invention, Figure 2 is a fragmentary horizontal section taken on the line 2—2 of Figure 1, Figure 3 is a top plan view of the tank, certain portions of the concrete sheath or jacket and its re-enforcing mesh being broken away more clearly to reveal the elements therebeneath, and Figure 4 is a fragmentary section illustrating the application of our invention to a tank having an overhanging top or roof.

Similar characters of reference refer to similar parts throughout the several views.

Referring to the drawings, reference numerals 10, 11 and 12 indicate the top, bottom and cylindrical side walls of a metal tank which may be regarded as a gas purifier tank or a settling tank of the kind employed in the petroleum industries. The tank has been illustrated more or less diagrammatically, various elements of the tank with which our invention is not concerned have not been illustrated. The tank shown in Figs. 1 to 3 is provided with a side opening 13 which is normally sealed by a door or closure 14 which is detachably bolted to a suitable channel frame 15—15. It may be assumed that the tank is located in the open, and that the tank is equipped with heating or cooling devices, depending upon the purpose for which the tank is to be used. It may also be assumed that a substantially constant temperature, either high or low, should be maintained within the tank under operating conditions.

In applying our invention to a tank of the type shown in Figs. 1 to 3, we apply sheets or slabs of cork 16 to the outer surface of the vertical wall of the tank, and secure these sheets or slabs of cork in position by means of metal girths 17—17, some of which extend wholly around the tank, and some of which extend only partially around the tank for the reason hereinafter explained. Comparatively heavy wire or wire sash cord is employed in forming the girths 17. The thickness of the cork may, of course, be varied to suit the peculiar requirements of any particular tank. While we prefer to employ cork as the insulating material, we appreciate that a similar use of any other suitable resilient and, preferably, spongy heat insulating material would be within the purview of our invention.

In cases where the tank is provided with a side door of the kind illustrated in Fig. 1, it is undesirable that any of the girths 17 pass over the door opening. With this fact in mind, we attach to the tank an angle frame 18 which lies around the door frame 15 and against the outer surface of the tank. Frame 18 may be secured to the tank in any suitable manner. In the drawings we have illustrated bolts 19 and small plates 20 as the means for holding frame 18 in position. The plates 20 preferably overlie contiguous portions of the angle and channels of frames 18 and 15, as illustrated in Fig. 2.

So many of the girths or bands 17 as lie between horizontal planes passing through the upper and lower margins of the frame 18 extend through apertures in the frame 18 and are there secured as in Fig. 2. Thus the girths or bands 17 in no way prevent or interfere with the removal or replacement of the door 14.

After the cork 16 has been applied to the vertical wall of the tank and has been secured in position by girths 17, as previously explained, a plurality of equally spaced vertical rods 21 are disposed around the tank as shown in Figs. 1 and 2. These rods may be held in position by any suitable means, for instance, by light tie wires (not shown) which are twisted around the said rods 21 and under the girths 17. It is desirable, however, that the rods 21 be spaced outwardly from the cork insulation 16, and to accomplish this purpose, we employ spacing devices 22, there being preferably a plurality of these spacing devices inserted between each rod 21 and the cork 16. The details of the spacing devices are not important. They may be in the form of metal clips or wooden blocks. It is desirable that they be comparatively small and, of course, capable of effectively spacing the rods 21 from the cork 16.

Steel mesh 23 is now stretched over the rods 21 and is attached to said rods by wire ties or other equivalent means (not shown). At this point we will state that the rods 21—21 are preferably spaced from the cork 16 to an extent sufficient to cause the mesh 23 to lie at the center of the concrete sheath or jacket which is subsequently applied in the manner presently to be explained.

The top 10 of the metal tank is now covered with sheets or slabs of cork indicated at 16$^a$. It is not ordinarily necessary to employ means corresponding to girths 17 for holding the cork 16$^a$ in position. The spaces between the several sheets or slabs which constitute the tank top insulation may now be filled with ground cork, if desired. Rods 21$^a$—21$^a$ are now arranged radially of the tank and over the cork layer 16$^a$, as illustrated in Fig. 3. The rods 21$^a$ are preferably spaced from the cork by spacing devices 22$^a$ which need not differ essentially from the spacers 22 which are associated with the bars 21. If desired, rods 21$^a$ may be held in the position shown in Fig. 3 by tie wires (not shown). Steel mesh 23$^a$ is now stretched over rods 21$^a$ and is tied to said rods, if necessary.

We now call attention to the band of material 24 which is interposed between the cork 16 and the cork 16$^a$. This material may vary considerably in its formation and constituents but need not differ essentially from the material employed in the expansion joints of concrete pavements. A very satisfactory material for our purpose consists of alternate layers of asphalt and fabric or paper. It will be noted that the material 24 projects outwardly beyond the outer upper edge of the cork 16.

A rectangular frame 25 is now preferably applied to the outer surface of door 14 as illustrated in Fig. 2, and that portion of the outer surface of the door which lies within the frame is overlaid with a cork slab indicated at 16$^b$. The cork 16$^b$ is retained in position by a wire or wires 26, said wire or wires being stretched or laced across channel frame 25 as illustrated.

Concrete sheaths or jackets 27 and 27$^a$ are now applied to the side and top of the tank as illustrated in Fig. 1. The concrete is "shot" into position under pressure by means of one of the several forms of "concrete guns" now well known to persons familiar with methods of applying concrete. Concrete applied in this fashion sets quickly and forms a substantially waterproof sheath for the heat insulating cork which lies therebeneath. It should be noted that the concrete lies in and around the mesh 23 and 23ª and around the rods 21 and 21ª. The thickness of each concrete sheath or jacket is such that the steel mesh therein contained lies substantially at the center thereof. It should also be noted that the concrete jackets or sheaths 27 and 27ª are separated by the material 24 to which we have previously alluded. The concrete jacket 27ᵇ is now applied to the cork 16ᵇ which overlies the door 14. The concrete jacket 27ᵇ is also conveniently applied by the use of a "concrete gun" and entirely covers the wire or wires 26, which are stretched or laced across the frame 25 in the manner previously explained.

In some cases a tank will be found to have an overhanging top or roof of the kind exemplified in Figure 4. In this event, the expansion joint material 24 is interposed between the overhanging portion of the tank top and the cork 16 and the concrete sheath or jacket 27. Moreover, in a case of this kind, the outer margin of the steel mesh 23ª is conveniently turned under the outer edge of the overhanging portion of the tank top, as illustrated in Fig. 3. Otherwise, the application of our invention to a tank having an overhanging top or roof need not differ essentially from the manner in which we apply the invention to a tank of the type illustrated in Figs. 1 to 3 inclusive.

The cork jacket with which the tank is provided constitute an effective heat insulator. The several concrete jackets adequately protect the insulating material. Expansion and contraction of the metal tank will not disrupt the concrete jackets or the girths 17 because the cork, being resilient and spongy, yields under compression and thus compensates for differences in the coefficients of expansion and contraction of the concrete and steel between which the cork is interposed. The material 24 maintains substantially tight joints between the coverings for the top and side walls of the tank despite the fact that the height of the metal tank may vary considerably under temperature changes.

The manner of applying our invention may, of course, be varied considerably without departing from the scope or spirit of our invention. Hence, we do not limit ourselves to the specific elements and construction of parts herein shown, but desire to claim all equivalent constructions falling within the scope of the appended claims.

What we claim is:

1. In combination, a metal tank, heat insulating jackets overlying the outer surfaces of the tank, re-enforced concrete jackets directly overlying the heat insulating jackets, the heat insulating jackets being formed of a material that is adapted to yield to prevent disruption of the concrete jackets due to differences in the expansion or contraction of said concrete jackets and the tank walls.

2. In combination, a metal tank having heat insulating jackets of cork overlying the outer surfaces of the tank walls, and re-enforced concrete jackets overlying the heat insulating jackets directly.

3. In combination with a metal tank having top and side walls, cork slab insulating jackets overlying the outer surfaces of said walls, jackets of re-enforced concrete directly overlying said cork slab jackets, and an expansion joint between the concrete jacket which overlies the tank top insulation and the concrete jacket which overlies the side wall insulation.

4. In combination, a metal tank, jackets of compressible heat insulating material overlying the outer surfaces of the top and side wall of said tank, concrete jackets overlying the heat insulating jackets directly, and expansion joints between the concrete jacket which overlies the tank top insulation and the concrete jacket which overlies the side walk insulation.

5. In combination, a metal tank, a layer of compressible heat insulating material overlying the outer surfaces of said tank, a layer of metal lathing overlying said heat insulating material, and a layer of concrete carried by said lathing.

6. In combination, a metal tank, a layer of compressible heat insulating material overlying the outer surfaces of said tank, tension devices for retaining said material in position, a layer of metal lathing overlying said heat insulating material and spaced therefrom, and a layer of concrete carried by said lathing.

7. In combination, a metal tank, cork slabs overlying the outer surfaces of said tank, tension devices for retaining said slabs in position, a layer of metal lathing overlying said cork slabs, and a layer of concrete carried by said lathing.

In witness whereof, we hereunto subscribe our names this 28th day of November, 1921.

JULIAN C. SMITH.
ARNOLD W. TOTMAN.

Witnesses:

I. A. JOHNSON,
M. A. HALL.